(12) United States Patent
Awaji

(10) Patent No.: US 7,426,986 B2
(45) Date of Patent: Sep. 23, 2008

(54) ONE-WAY CLUTCH OF PACKAGE TYPE

(75) Inventor: Toshio Awaji, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 233 days.

(21) Appl. No.: 11/332,259

(22) Filed: Jan. 17, 2006

(65) Prior Publication Data

US 2006/0169559 A1    Aug. 3, 2006

(30) Foreign Application Priority Data

Jan. 18, 2005    (JP) .............................. 2005-010286

(51) Int. Cl.
  F16D 11/00    (2006.01)
  F16D 13/60    (2006.01)
  F16D 11/06    (2006.01)
  F16D 13/04    (2006.01)
  F16D 23/00    (2006.01)
  F16D 43/00    (2006.01)

(52) U.S. Cl. ................................. 192/41 R; 192/109 A

(58) Field of Classification Search ................ 192/45.1, 192/110 B, 41 R, 40 A, 109 R, 109 A
  See application file for complete search history.

(56) References Cited

U.S. PATENT DOCUMENTS

| 3,017,002 | A | * | 1/1962 | Marland ....................... 192/45 |
| 5,052,518 | A | * | 10/1991 | Trommer .................... 184/6.12 |
| 5,529,158 | A | * | 6/1996 | Itoh et al. ...................... 192/35 |
| 5,836,432 | A | * | 11/1998 | Husse et al. ............. 192/70.13 |
| 6,068,097 | A | * | 5/2000 | Kurita .......................... 192/27 |
| 6,679,364 | B2 | | 1/2004 | Muramatsu et al. ........... 192/46 |
| 2004/0129524 | A1 | * | 7/2004 | Kurita .......................... 192/45 |
| 2004/0216974 | A1 | * | 11/2004 | Aida ........................... 192/45 |

FOREIGN PATENT DOCUMENTS

JP    2002-310200    10/2002

\* cited by examiner

*Primary Examiner*—Tisha D Lewis
(74) *Attorney, Agent, or Firm*—Miles & Stockbridge P.C.

(57) ABSTRACT

A one-way clutch of package type which includes a one-way clutch comprising an inner race, an outer race and a torque transferring member for transferring torque between the inner race and the outer race and in which a bearing is integrally incorporated between the inner and outer races of the one-way clutch and wherein a biasing member is interposed between an axial end face of at least one of projections of the inner and outer races of the one-way clutch and an axial end face of an inner race or an outer race of the bearing.

8 Claims, 1 Drawing Sheet

ONE-WAY CLUTCH OF PACKAGE TYPE

BACKGROUND OF THE INVENTION

1. Field of the Invention

The present invention relates to a one-way clutch of package type-which is used in general industrial fields for application to over-run, index or back stop and in which an outer race, an inner race and bearings are incorporated integrally with each other.

2. Related Background Art

A one-way clutch has widely been used in general industrial fields. For example, the one-way clutch is used in over-run (in which the clutch is engaged or idly rotated by utilizing a difference in rotation between an outer race and an inner race), various automatic machines, fans, pumps, index (used in intermittent feed-mechanisms for converting a continuous rotation or a reciprocal movement of an input shaft into an intermittent movement) printing machines, wrapping machines and press machines, and back stop for conveyors. Further, the one-way clutch is used in automatic transmissions of vehicles and torque converters.

For these applications, a one-way clutch of package type in which a one-way clutch comprising a splug having a wedging function or a torque transferring member such as a clutch having a one-way clutch function is supported at its both sides by radial bearings and is combined integrally by an outer race, an inner race and snap rings has been used. For example, such a one-way clutch of package type is disclosed in Japanese Patent Application Laid-open No. 2002-310200 (corresponding to U.S. Pat. No. 6,679,364).

In case of such a one-way clutch of package type, an inner one-way clutch member is designed so as not to cause axial restraint to permit a one-way clutch action. Further, in order to integrate the one-way clutch member, outer race and inner race, steps are formed between the outer race and the inner race and ball bearings are provided at both sides and an axial movement is regulated by snap rings.

However, due to dispersion in a dimension of the step of the outer or inner race, dispersion in a distance between the step of the outer race and the snap ring, dispersion in a width of a groove for the snap ring, dispersion in a width of the snap ring, dispersion in a width of the bearing and/or dispersion in bearing clearance, when the outer race and the inner race are combined, great axial play is generated.

When the one-way clutch of package type is used in an automatic assembling machine, a printing machine or a press machine, which requires high accuracy, such axial play may affect a bad influence upon such a machine. Particularly, in an apparatus which includes a vertical reciprocating mechanism and in which the one-way clutch is used on a vertical axis, the axial play must be reduced as much as possible in order to maintain positional accuracy.

SUMMARY OF THE INVENTION

Accordingly, an object of the present invention is to provide a one-way clutch of package type in which an outer race, an inner race and bearings are incorporated integrally with each other and which can eliminate axial play of the inner and outer races.

To achieve the above object, the present invention provides a one-way clutch of package type which includes a one-way clutch comprising an inner race, an outer race and a torque transferring member for transferring torque between the inner race and the outer race and in which a bearing is integrally incorporated between the inner and outer races of the one-way clutch and wherein a biasing member is interposed between an axial end face of at least one of projections of the inner and outer races of the one-way clutch and an axial end face of an inner race or an outer race of the bearing.

With this arrangement, axial play is eliminated, with the result that automatic precise assembling and feeding accuracy in the application as index can be enhanced. Further, even when the one-way clutch of package type is used on a vertical axis, positional accuracy can easily be maintained.

DESCRIPTION OF THE PREFERRED EMBODIMENTS

Figure 1:
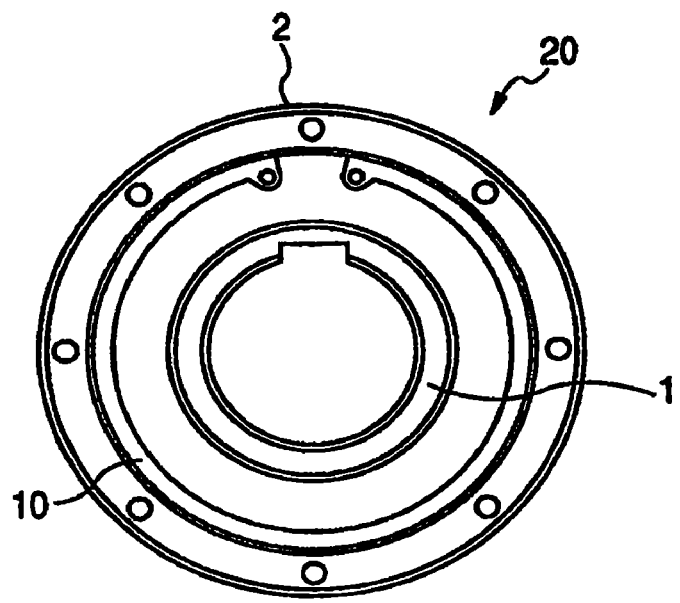
FIG. 1 is a front view of a one-way clutch of package type according to the present invention.

Now, an embodiment of the present invention will be fully explained with reference to the accompanying drawings. Incidentally, in the drawings, the same elements or members are designated by the same reference numerals. Further, the embodiment which will be described hereinbelow is merely exemplary and does not limit the present invention in all senses.

Figure 2:
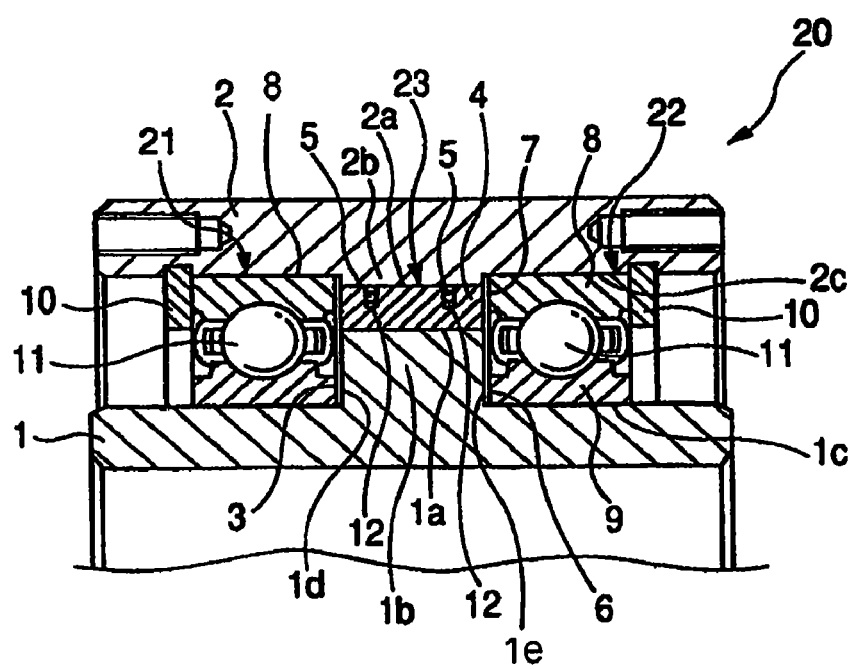
FIG. 2 is an axial sectional view of the one-way clutch of package type according to the present invention.

FIG. 1 is a front view of a one-way clutch 20 of package type according to the present invention and FIG. 2 is an axial sectional view of the one-way clutch 20 of package type. For simplicity's sake, hereinafter, the one-way clutch of package type will be referred to merely as "one-way clutch".

A one-way clutch member 23 is constituted by an inner race 1 fitted on a rotary shaft (not shown), an outer race 2 disposed coaxially with the inner race 1 and rotatable relative to the inner race 1, and a plurality of torque transferring members or cam members 4 disposed between an outer peripheral track surface 1a of the inner race 1 and an inner peripheral track surface 2a of the outer race 2 and adapted to transfer torque between the inner race and the outer race.

The plurality of cam members 4 are arranged along a circumferential direction and grooves 12 extending in the circumferential direction are formed in an outer peripheral surface of each cam member and garter springs 5 are disposed in the grooves 12. In the illustrated embodiment, while an example that two grooves 12 are provided was explained, a single groove may be used. The garter springs 5 are coil springs and serve to hold the cam members 4 against the outer peripheral-track surface 1a of the inner race 1.

The outer peripheral track surface 1a of the inner race 1 is provided on an annular projection 1b protruding toward an outer diameter side and the inner peripheral track surface 2a of the outer race 2 is provided on an annular projection 2b protruding an inner diameter side. Axial both sides of the projection 1b of the inner race 1 provide annular peripheral faces 1c into which bearings 21 and 22 are fitted. A diameter of the projection 1b is greater than the peripheral faces 1c. Further, axial both sides of the projection 2b of the outer race 2 provide annular peripheral faces 2c into which the bearings 21 and 22 (described later) are fitted. A diameter of the projection 2b is smaller than the peripheral faces 2c.

The bearings 21 and 22 are disposed at both axial sides of the projection 1b of the inner race 1 and the projection 2b of the outer race 2. While the bearings 21 and 22 are shown as radial bearings here, it should be noted that bearings of other types may be used as the bearings 21 and 22. Each of the bearings 21 and 22 comprises an outer race 8 fitted on the outer race 2 of the one-way clutch 20, an inner race 9 fitted on the inner race 1 of the one-way clutch 20, and balls 11 rolling between the inner race 9 and the outer race 8.

As shown in FIG. 2, the bearings 21 and 22 are fitted between the inner race 1 and the outer race 2 to pinch the projections 1b and 2b therebetween, and the outer races 8 are positioned by annular snap rings 10 in an axial direction so that the bearings are prevented from dislodging from the inner race 1 and the outer race 2. Annular side plates 7 secured to the outer race 2 are disposed between the bearings and the cam members 4 to hold the cam members 4 in the axial direction.

One axial end faces of the inner races 9 of the bearings 21 and 22 are opposed to axial end faces 1d and 1e of the projection 1b of the inner race 1, respectively. An annular wave spring 3 is disposed between the inner race 9 of the bearing 21 and the end face 1d, and a wave spring 6 is disposed between the inner race 9 of the bearing 22 and the end face 1e.

Since the wave springs 3 and 6 are provided between the inner races 9 of the bearings 21 and 22 and the projection 9 and elastic forces of the wave springs 3 and 6 act in the axial direction, axial play is eliminated, thereby enhancing precise automatic assembling and feeding accuracy in the application as index. Further, even when the one-way clutch 20 is used on a vertical axis, positional accuracy can easily be maintained.

The wave springs 3 and 6 may be known wave springs. In the illustrated embodiment, while an example that single wave spring is provided between the projection 1b and the bearing 21 and single wave spring is provided between the projection 1b and the bearing 22 was explained, plural wave springs may be provided between the projection 1b and the bearings 21 and 22, respectively. Further, a wave spring of coil type may be used. In addition, a continuous annular wave spring or a wave spring of partially cut type may be used.

In the illustrated embodiment, while an example that the wave springs 3 and 6 are interposed between the inner races 9 of the bearings 21 and 22 and the projection 1b of the inner race 1 of the one-way clutch 20 was explained, if the snap rings are mounted to the inner race 1, the wave rings may be disposed between the outer races 8 of the bearings 21 and 22 and the projection 2b of the outer race 2 of the one-way clutch 20.

While it is preferable to use the wave springs as bearings since high load can be obtained with small stroke, other springs such as coned disc springs may be used. Further, the one-way clutch member 23 may be of splug type, cam type or roller type.

This application claims priority from Japanese Patent Application No. 2005-010286 filed on Jan. 18, 2005, which is hereby incorporated by reference herein.

What is claimed is:

1. A one-way clutch of package type comprising:
   a one-way clutch device having an inner race, an outer race, and a torque transferring member which transfers torque between said inner race and said outer race;
   a bearing integrally incorporated between said inner and outer races of the one-way clutch; and
   a biasing member interposed between an axial end face of a projection of said inner race of said one-way clutch and an axial end face of an inner race of said bearing, said biasing member being disposed so as to apply a biasing force to said inner race of said bearing.

2. A one-way clutch of package type according to claim 1, wherein said biasing member is a spring.

3. A one-way clutch of package type according to claim 2, wherein said spring is a wave spring.

4. A one-way clutch of package type according to claim 1, wherein said bearing is a radial ball bearing.

5. A one-way clutch of package type according to claim 4, wherein said biasing member is a spring.

6. A one-way clutch of package type according to claim 5, wherein said spring is a wave spring.

7. A one-way clutch of package type comprising:
   a one-way clutch device having an inner race, an outer race, and a torque transferring member which transfers torque between said inner race and said outer race;
   a bearing integrally incorporated between said inner and outer races of said one-way clutch; and
   a biasing member interposed between an axial end face of a projection of said outer race of said one-way clutch and an axial end face of an outer race of said bearing, said biasing member being disposed so as to apply a biasing force to said outer race of said bearing.

8. A one-way clutch of package type according to claim 7, wherein said bearing is a radial ball bearing.

* * * * *